United States Patent
Janakiraman et al.

(10) Patent No.: US 8,887,237 B2
(45) Date of Patent: Nov. 11, 2014

(54) MULTIMODE AUTHENTICATION

(75) Inventors: Ramsundar Janakiraman, Sunnyvale, CA (US); Rajesh Mirukula, San Jose, CA (US); Brijesh Nambiar, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 368 days.

(21) Appl. No.: 13/107,743

(22) Filed: May 13, 2011

(65) Prior Publication Data

US 2012/0291098 A1    Nov. 15, 2012

(51) Int. Cl.
*H04L 29/06* (2006.01)
*H04L 29/12* (2006.01)
*H04L 12/46* (2006.01)

(52) U.S. Cl.
CPC ........ *H04L 61/2015* (2013.01); *H04L 12/4641* (2013.01); *H04L 63/08* (2013.01)
USPC ................. 726/3; 713/150; 713/163

(58) Field of Classification Search
USPC .............................................. 713/150; 726/3
See application file for complete search history.

(56) References Cited

U.S. PATENT DOCUMENTS

| | | | | |
|---|---|---|---|---|
| 6,473,411 | B1 * | 10/2002 | Kumaki et al. | 370/331 |
| 7,054,944 | B2 * | 5/2006 | Tang et al. | 709/229 |
| 7,114,070 | B1 * | 9/2006 | Willming et al. | 713/156 |
| 8,054,804 | B2 * | 11/2011 | Small et al. | 370/331 |
| 8,375,109 | B1 * | 2/2013 | Lange et al. | 709/221 |
| 2007/0147299 | A1 * | 6/2007 | Ando et al. | 370/331 |
| 2007/0237148 | A1 * | 10/2007 | Jabr et al. | 370/392 |

FOREIGN PATENT DOCUMENTS

WO    WO 2005060208 A1 *  6/2005

OTHER PUBLICATIONS

"Determining Lease Duration", Retrieved from: http://technet.microsoft.com/en-us/library/cc783573(v=ws.10).aspx; Mar. 28, 2003.*

* cited by examiner

*Primary Examiner* — Mohammad L Rahman
(74) *Attorney, Agent, or Firm* — Varun A. Shah

(57) ABSTRACT

Assigning clients to VLANs on a digital network. A client attaching to a digital network through a network device is initially assigned to a first VLAN. This VLAN may have restricted access and is used for authentication. The device snoops DHCP traffic on this first VLAN rewriting DHCP traffic from the client to request a short lease time for the client. A short lease time may be on the order of 30 seconds. The device optionally rewrites DHCP traffic to the client on the first VLAN to assure a short lease time is returned; this rewriting supports DHCP servers which do not issue short leases. Traffic on this first VLAN may be limited to authentication such as captive portals, 802.1x, Kerberos, and the like. If client authentication on the first VLAN does not succeed, when the short lease expires, the client will receive another short lease on the first VLAN. The network device snoops authentication traffic. When authentication succeeds, the device snoops this traffic and derives information such as roles and the target VLAN for the client, saving this information. When the short DHCP lease expires for the client, and the client restarts the DHCP process, the device assigns the client to the target VLAN and all further processing occurs on this target VLAN.

29 Claims, 2 Drawing Sheets

MULTIMODE AUTHENTICATION

BACKGROUND OF THE INVENTION

The present invention relates to digital networks, and more particularly, to the problem of associating a user to the proper VLAN in a network.

Digital networks have rapidly become the backbone of many enterprises, small and large. As these networks become more vital to enterprise operation, their security and integrity also become more vital. A central issue involves just which network resources a user of the network should be allowed to access. One way of addressing access issues is to segregate network devices using virtual local area networks (VLANs). Different VLANs on the same physical network may offer different levels of access to resources. For example, one VLAN may be for guests, with filtered access to the Internet and no access to enterprise resources. Different enterprise VLANs may offer access to different groupings of enterprise resources.

The issue becomes, then, one of assigning network users to the proper VLAN. When a user device is connected to the network, it must be assigned to a VLAN and given an address through a DHCP server associated with that VLAN.

In wired networks, one approach is to associate all unused wired ports with a limited access VLAN such as a guest VLAN. When a client device connects to a port on a network device, the network device tries to recognize the client by its MAC address. If the client is recognized, it is connected to the VLAN associated with the MAC address. Further processing for DHCP, authentication, and the like will take place on that VLAN. If the client is not recognized, it stays with the limited access VLAN which may limit connections, for example, to a captive portal.

The network device snoops traffic on the port for this limited access VLAN looking for 802.1x authentication traffic. If 802.1x authentication packets are detected, they are forwarded by the device to the proper 802.1x authentication server. The network device also snoops return packets from the 802.1x authentication server. If the authentication succeeds, the network device picks out the new VLAN for the client.

The client device must now be transferred to the new VLAN and a new address assigned to it. This is commonly done using the artifice known as port flapping, where the port to which the client is connected is disabled or turned off, and then re-enabled or turned on.

This port flapping should cause a well-behaved client to disconnect and attempt to reconnect, restarting address acquisition through DHCP. The network device will now recognize the client's MAC address, assign it to the VLAN specified in the 802.1x authentication, and further processing including DHCP will proceed on the new VLAN.

Unfortunately, port flapping does not always work, or is not available. As an example, port flapping is not available over wireless LANs. Port flapping is not appropriate when multiple supplicants are involved. Some clients are not well behaved, as an example, beginning the 802.1x authentication process before an address has been resolved through DHCP, or not dealing with port flapping in a predictable manner.

What is needed is a way of reassigning clients to VLANs.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of assigning and reassigning clients to VLANs on a digital network.

According to the present invention, when a client connects to a digital network having multiple VLANs, it is assigned to a first VLAN. The network device identifies the client by its MAC address and determines if a VLAN has been associated with that MAC address. If a VLAN is associated with the client MAC address, the client is connected to that VLAN for all further traffic.

If the client MAC is not recognized, the client device is assigned to a first VLAN. As an example, this first VLAN may provide only limited access, such as to a DHCP server, captive portal, and/or other authentication services. The network device snoops and rewrites DHCP traffic from and to the client to give the client an address with a short lease on this first VLAN. As an example, a short lease may be on the order of thirty seconds. The network device rewrites the DHCP request from the client to the DHCP server to request a short lease, and optionally rewrites the response from the DHCP server to return a short lease to the client. Note that the network device snoops and rewrites DHCP traffic when the device is also acting as a DHCP relay, supporting the DHCP server itself, or the DHCP server is external to the device.

The device also snoops for authentication traffic, and routes that authentication traffic to the proper authentication server. This routing may be through NAT or through proxies. The result of successful authentication is also snooped, and a destination VLAN captured from the authentication traffic. Roles applicable to the client may also be derived from authentication results.

When authentication succeeds and a destination VLAN is extracted from the traffic, the network device retains this new VLAN associated with the client MAC address.

When the short DHCP lease expires, the client will restart the connection and DHCP process. The network device will recognize the client by its MAC address and assign it to the associated VLAN, where further processing will take place.

Figure 1:
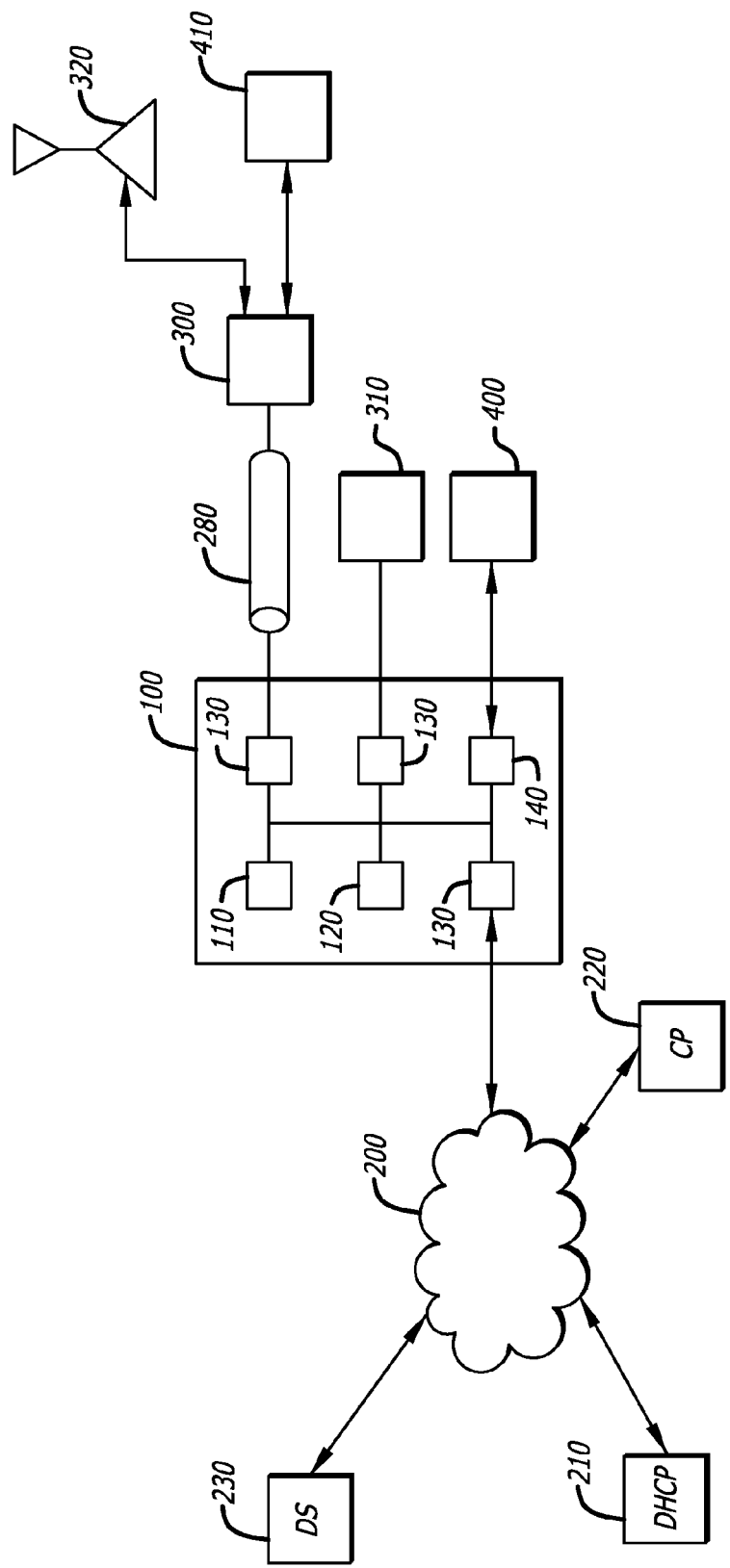
FIG. 1 shows devices in a network.

FIG. 1 shows a network in which smart network switch 100 is a purpose-made digital device containing a processor 110, memory hierarchy 120, and input-output interfaces 130. In one embodiment of the invention, a MIPS-class processor such as those from CAVIUM® or RMI® is used. Other suitable processors, such as those from ACORN®, INTEL®, or AMD® may also be used. The memory hierarchy 120 traditionally comprises fast read/write memory for holding processor data and instructions while operating, and nonvolatile memory such as EEPROM and/or Flash for storing files and system startup information. Wired interfaces 130 are typically IEEE 802.3 Ethernet interfaces, used for wired connections to other network devices such as switches, or to a controller. Wireless interfaces, such as those used in wireless access points are typically 802.11 interfaces. In one embodiment of the invention, switch 100 operate under control of a LINUX® operating system, with purpose-built programs providing switch functionality in addition to the present invention. Switch 100 typically communicates with other network devices 300, 310, 320, which are also a purpose-built digital devices having a processor, memory hierarchy, and commonly a plurality of interfaces, wired and/or wireless.

Client devices 400 and 410 have a similar architecture, chiefly differing in input/output devices; a laptop computer will usually contain a large LCD, while a handheld wireless scanner will typically have a much smaller display, but contain a laser barcode scanner. As is known to the art, each wired or wireless network interface 130 has a unique address known as a MAC address which may be used to identify the device.

As shown in FIG. 1, switch 100 communicates with network 200, which hosts services such as DHCP server 210 and authentication services such as Captive Portal 220 and Domain Server 230. In one embodiment, these services may be based on one or more digital computers specifically programmed to provide these services. One or more of these services such as DHCP server 210 may also be built into switch 100.

Figure 2:
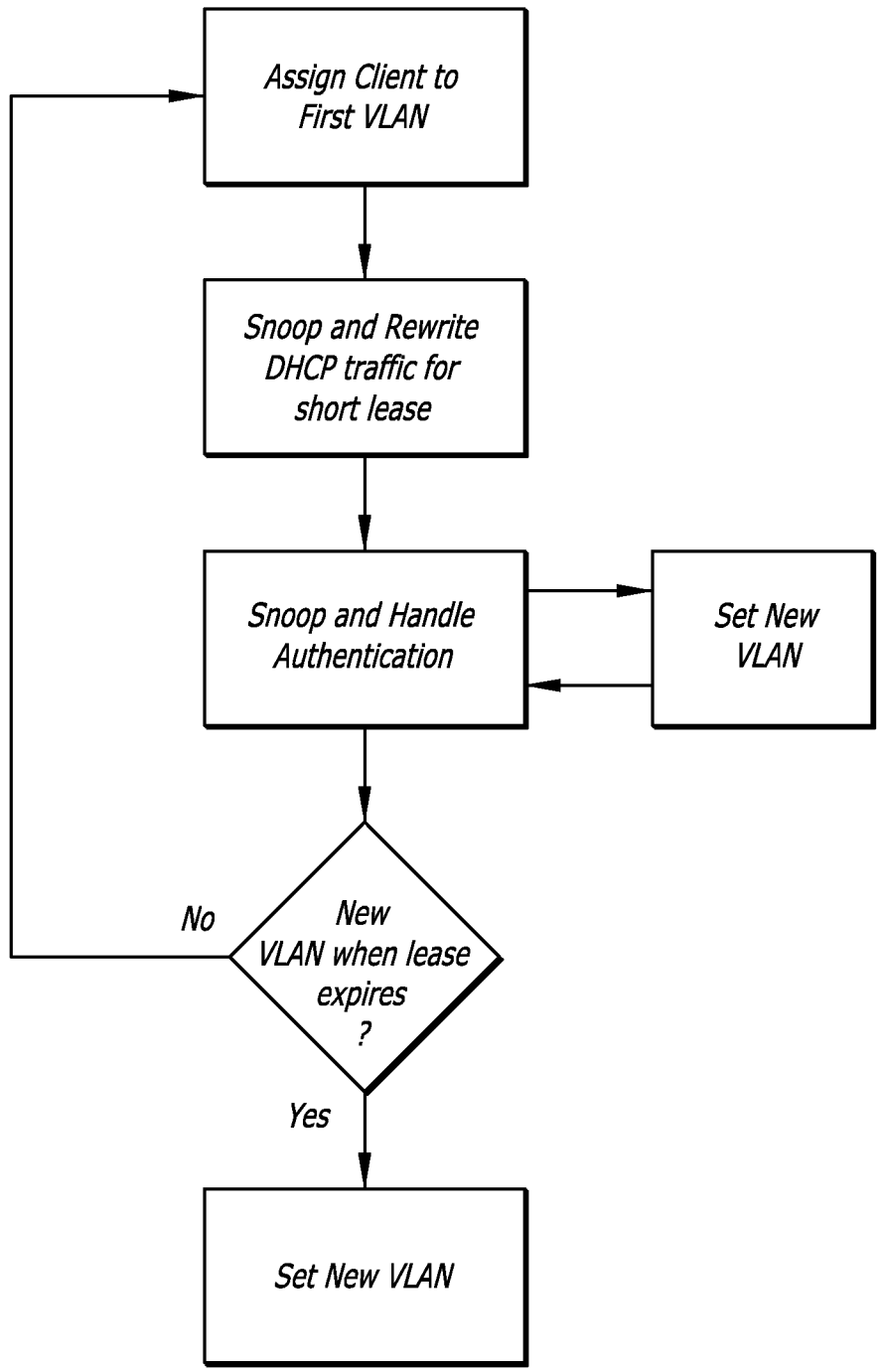
FIG. 2 shows a simplified flowchart.

According to the present invention and as shown in the simplified flowchart of FIG. 2, when a client such as client 400 connects to the network such as to a port 140 on switch 100, client 400 is assigned to a first VLAN, herein noted as VLAN1.

It is assumed that the overall network provides a plurality of VLANs, each providing different levels and granularity of access to network resources. As examples, a guest VLAN may provide access to the Internet, filtered to provide access through a limited set of ports and through filters restricting access, and providing no access to internal enterprise resources. Different VLANs may be provided for employees and contractors, each providing different levels of access to enterprise resources.

As an example, a VLAN provided for finance contractors may provide access to certain finance resources such as databases and printers, but not to resources outside of finance, such as in marketing and/or engineering.

In one embodiment of the invention, VLAN1 is used during authentication and provides limited access to resources such as DHCP server 210, and to authentication services such as captive portal 220, and domain server 230.

When client 400 connects to port 140 on switch 100, client 400 is assigned to VLAN1 for authentication.

Client 400 will typically acquire a network address using DHCP. Switch 100 routes these DHCP requests to the DHCP server for VLAN1, DHCP server 210. DHCP server 210 will return an address on VLAN1 for device 400.

The operation of DHCP is known to the art, defined for example in RFC 2131 for IPv4 and in RFC 3315, RFC 3633, and RFC 3736 for DHCPv6. The DHCP lease time specifies how long the supplied address is valid. DHCP default lease times may be configured, and may be hours, days, or set to never expire.

According to the present invention, switch 100 rewrites the DHCP request from device 400 to DHCP server 220 to request a short lease on VLAN1. In one embodiment, a short lease is on the order of thirty seconds.

Optionally switch 100 snoops the return traffic from DHCP server 220 to client 400, and insures that a DHCP Offer on VLAN1 is returned with a short lease as requested. This optional rewriting allows the present invention to operate successfully when used with a DHCP server which does not support short lease requests; in such cases, switch 100 rewrites the DHCP Offer packet to provide a short lease to client 400.

Assume in a first case that client 400 is a guest device. Client 400 is connected to VLAN1 which only provides access to DHCP services and to authentication services such as captive portal 220 and domain server 230. Client 400 interacts with captive portal 220. Assume Captive portal 220 authorizes client 400 as a guest for VLAN2.

Switch 100 snoops traffic on VLAN1, and so sees the traffic between client 400 and captive portal 220. When captive portal 220 returns successful authentication to client 400, switch 100 snoops this traffic and derives rules and target VLAN information from the traffic from Captive Portal 220 and client 400. Switch 100 saves this information, associating it with client 400, as an example by using client 400's MAC address.

According to the present invention, when the short DHCP lease to client 400 expires, client 400 will begin the DHCP process again to acquire a new address. Switch 100 intercepts this DHCP traffic, recognizes client 400 for example by MAC address, and assigns client 400 to VLAN2 as specified from captive portal 220. Client 400 obtains a new address from the DHCP server supporting VLAN2, and receives an address with a normal lease time. All further traffic to and from client 400 takes place on VLAN2.

Optionally, when switch 100 reassigns client 400 from VLAN1 to VLAN2, it sends a DHCP release on VLAN1 for client 400. This optional step covers DHCP servers which do not support short lease times.

In another aspect of the present invention, assume client 410 connects to the network via switch 300 which connects to switch 100 via tunnel 280. In one embodiment, tunnel 280 is a GRE tunnel. The use of a tunnel between switch 100 and switch 300 allows switch 300 to be anywhere on the broader L3 network. As an example, switch 100 could be in a corporate datacenter located in Dallas, and switch 300 supporting client 410 located in a field office in Omaha.

When client 410 connects to switch 100 via switch 300, it is initially assigned to VLAN1 and begins the process of obtaining an address via DHCP. This lease will have a short lease time. Assume client 410 is an enterprise device. Client 410 begins authentication, such as 802.1x or Kerberos authentication.

Switch 100 is snooping traffic on VLAN1 and recognizes authentication traffic coming from client 410 on VLAN1. Switch 100 routes this authentication traffic to the proper destination. This may be to an 802.1x server, or to a Kerberos server for Kerberos authentication, Domain Server 230, or to other appropriate authentication services. This routing may be performed through NAT or the use of proxies.

Switch 100 snoops return traffic on VLAN1 from the authentication service back to client 410. When authentication succeeds, switch 100 captures this traffic, and derives information such as rules and the new target VLAN for client 410. Assume the new VLAN for client 410 is to be VLAN3. When the short lease time on VLAN1 expires for client 410 and client 410 restarts the DHCP process, switch 100 reassigns client 410 to VLAN3, and all further traffic, including DHCP, proceeds on VLAN3.

It should be understood that the steps and processes of the present invention may be performed in a network switch, in a network controller, in access points, or other network devices.

The present invention may be realized in hardware, software, or a combination of hardware and software. A typical combination of hardware and software may be a controller or access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A system comprising:
   at least one network device comprising a hardware processor;
   the system being configured to perform operations comprising:
      receiving, by the at least one network device from a client device, a Dynamic Host Configuration Protocol (DHCP) request;
      rewriting, by the at least one network device, the DHCP request to include a particular lease time; and
      subsequent to the rewriting operation: forwarding, by the at least one network device to a DHCP server, the DHCP request with the particular lease time.

2. The system of claim 1, wherein the operations further comprise:
   snooping DHCP traffic from the DHCP server;
   rewriting a response to the DHCP request included in the DHCP traffic to the client to indicate the particular lease time.

3. The system of claim 1, wherein the operations further comprise:
   issuing a DHCP release for an address, on a virtual local area network (VLAN), associated with the client device.

4. A non-transitory machine readable medium having a set of instructions stored in nonvolatile form therein, which when executed on a network device, causes a set of operations to be performed, comprising:
   receiving, by a network device from a client device, a Dynamic Host Configuration Protocol (DHCP) request;
   rewriting, by the network device, the DHCP request to include a particular lease time; and subsequent to the rewriting operation: forwarding, by the network device to a DHCP server, the DHCP request with the particular lease time.

5. The non-transitory machine readable medium of claim 4 having a set of instructions stored in nonvolatile form therein, which when executed on the network device, causes further operations to be performed, comprising:
   snooping DHCP traffic from the DHCP server;
   rewriting a response to the DHCP request included in the DHCP traffic to the client to indicate the particular lease time.

6. The non-transitory machine readable medium of claim 4 having a set of instructions stored in nonvolatile form therein, which when executed on the network device, causes further operations to be performed, comprising issuing a DHCP release an address, on a virtual local area network (VLAN), associated with the client device.

7. The non-transitory machine readable medium of claim 4, wherein rewriting the DHCP request comprises shortening the lease time included in the DHCP request to the particular lease time.

8. The non-transitory machine readable medium of claim 4, wherein prior to rewriting the DHCP request, the DHCP request does not specify any lease time.

9. The non-transitory machine readable medium of claim 4, wherein the DHCP request received from the client device specifies a first lease time, and wherein rewriting the DHCP request comprises modifying the first lease time to the particular lease time.

10. The non-transitory machine readable medium of claim 4, wherein the DHCP server grants a DHCP lease based on the particular lease time.

11. The non-transitory machine readable medium of claim 4, wherein the network device is a switch.

12. The system of claim 1, wherein the operations further comprise: rewriting the DHCP request comprises shortening a lease time included in the DHCP request to the particular lease time.

13. The system of claim 1, wherein the operations further comprise that, prior to rewriting the DHCP request, the DHCP request does not specify any lease time.

14. The system of claim 1, wherein the DHCP request received from the client device specifies a first lease time, and wherein rewriting the DHCP request comprises modifying the first lease time to the particular lease time.

15. The system of claim 1, wherein the DHCP server grants a DHCP lease based on the particular lease time.

16. A system comprising:
    at least one network device comprising a hardware processor;
    the system being configured to perform operations comprising:
       receiving, by the at least one network device, a first Dynamic Host Configuration Protocol (DHCP) lease time from a DHCP server in a response to a DHCP request;
       determining, by the at least one network device, if a client device is connected to a first VLAN;
       responsive to the client device being connected to the first VLAN: modifying, by the at least one network device, the first DHCP lease time to a second DHCP lease time that is different than the first DHCP lease time;
       subsequent to the modifying operation: forwarding, by the at least one network device, the response with the second DHCP lease time to a client device requesting a DHCP lease.

17. The system of claim 16, wherein the second DHCP lease time is shorter than the first DHCP lease time.

18. The system of claim 16, the operations further comprise:
    switching the client device from a first virtual local area network (VLAN) to a second VLAN.

19. The system of claim 18, the operations further comprise:
    issuing a DHCP release for a client address, on the first VLAN, associated with the client device.

20. A non-transitory machine readable medium having a set of instructions stored in nonvolatile form therein, which when executed on a network device, causes a set of operations to be performed, comprising:
    receiving, by a network device, a first Dynamic Host Configuration Protocol (DHCP) lease time from a DHCP server in a response to a DHCP request;
    determining, by the network device, if a client device is connected to a first VLAN;
    responsive to the client device being connected to the first VLAN: modifying, by the network device, the first DHCP lease time to a second DHCP lease time that is different than the first DHCP lease time;
    subsequent to the modifying operation: forwarding, by the network device, the response with the second DHCP lease time to a client device requesting a DHCP lease.

21. The non-transitory machine readable medium of claim 20, wherein the second DHCP lease time is shorter than the first DHCP lease time.

22. The non-transitory machine readable medium of claim 20, further comprising switching the client device from a first virtual local area network (VLAN) to a second VLAN.

23. The non-transitory machine readable medium of claim 22, further comprising issuing a DHCP release for a client address, on the first VLAN, associated with the client device.

24. The system of claim 2, wherein the at least one network device performs the operations of receiving the DHCP request, rewriting the DHCP, and forwarding the DHCP request.

25. The system of claim 24, wherein the at least one network device is a network switch that comprises the hardware processor, a memory and one or more input/output interfaces, the network switch is separate from and communicatively coupled to the client device and the DHCP server.

26. The non-transitory machine readable medium of claim 4 having the set of instructions executed on a processor of the network device being a network switch that (i) comprises the processor, a memory and one or more input/output interfaces and (ii) is separate from and communicatively coupled to the DHCP server and the client device.

27. The system of claim 16, wherein the at least one network device performs the operations of receiving the first DHCP lease time, determining if the client device is connected to the first VLAN, modifying the first DHCP lease time, and forwarding the response.

28. The system of claim 27, wherein the at least one network device is a network switch that (i) comprises the hardware processor, a memory and one or more input/output interfaces and (ii) is separate from and communicatively coupled to the client device and the DHCP server.

29. The non-transitory machine readable medium of claim 20 having the set of instructions executed on a processor of the network device being a network switch that (i) comprises the processor, a memory and one or more input/output interfaces and (ii) is separate from and communicatively coupled to the DHCP server and the client device.

* * * * *